Nov. 26, 1963  Q. A. HANSEN  3,111,822
CONTROLLED TORQUE, SELF-ENERGIZING WRAP SPRING CLUTCH OR BRAKE
Filed April 12, 1961  3 Sheets-Sheet 1
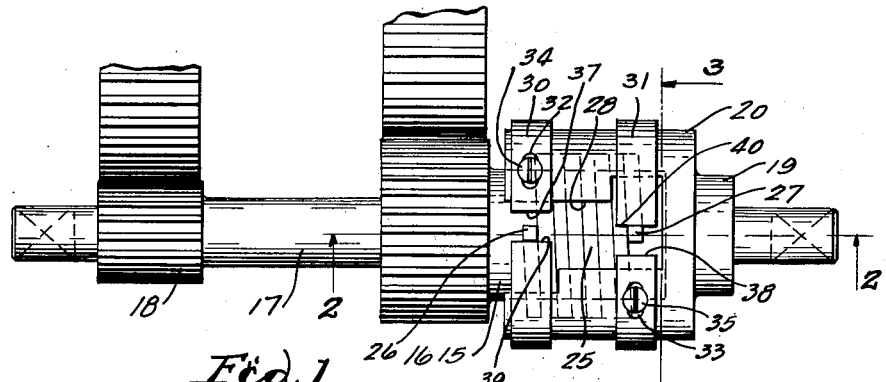
Fig. 1
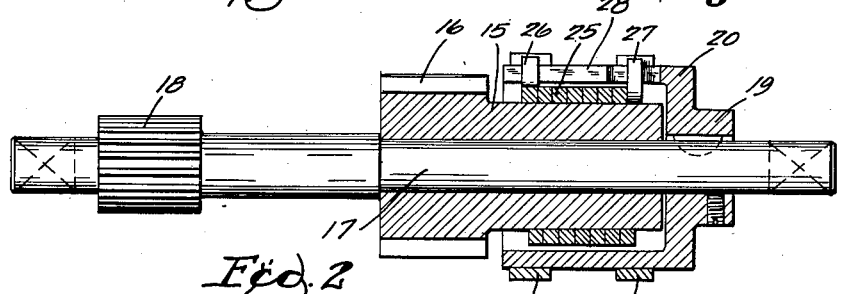
Fig. 2
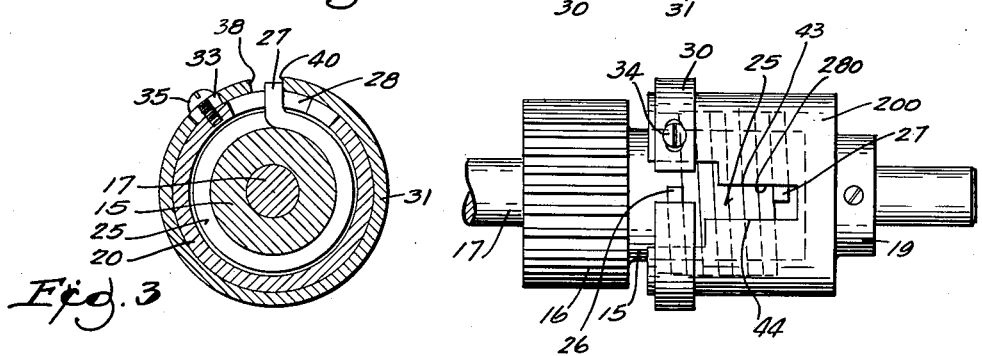
Fig. 3
Fig. 5
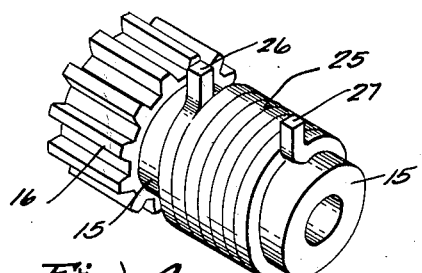
Fig. 4
INVENTOR.
QUINTEN A. HANSEN
BY
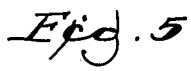
ATTORNEYS Nov. 26, 1963 Q. A. HANSEN 3,111,822
CONTROLLED TORQUE, SELF-ENERGIZING WRAP SPRING CLUTCH OR BRAKE
Filed April 12, 1961 3 Sheets-Sheet 2

INVENTOR.
QUINTEN A. HANSEN
BY
Wheeler, Wheeler & Wheeler
ATTORNEYS

Nov. 26, 1963    Q. A. HANSEN    3,111,822
CONTROLLED TORQUE, SELF-ENERGIZING WRAP SPRING CLUTCH OR BRAKE
Filed April 12, 1961    3 Sheets-Sheet 3

INVENTOR.
QUINTEN A. HANSEN
BY
Wheeler, Wheeler & Wheeler
ATTORNEYS

United States Patent Office 3,111,822
Patented Nov. 26, 1963

3,111,822
CONTROLLED TORQUE, SELF-ENERGIZING
WRAP SPRING CLUTCH OR BRAKE
Quinten A. Hansen, Rte. 2, Box 122, Franksville, Wis.
Filed Apr. 12, 1961, Ser. No. 102,467
15 Claims. (Cl. 64—28)

This invention relates to a controlled torque, self-energizing wrap spring clutch or brake.

All of the various embodiments herein disclosed are based on a wrap spring and gripping device. Such a spring has a self-energizing end and a non-energizing end and the present invention contemplates that the non-energizing end be yieldably fixed by a resilient split ring or caliper type spring which serves to control the torque which can be transmitted or braked through the wrap spring.

In many of the embodiments, one end of the load limiting caliper spring is relatively fixed and acts as a stop in one direction of movement of the non-energizing end of the wrap spring. Thus the caliper spring may have a dual function, providing a fixed stop in one direction of relative rotation and a yieldable seat in the opposite direction of a relative rotation.

The wrap spring is designed with a sufficient number of turns to provide ample self-energizing torque capacity at the lowest anticipated coefficient of friction. Its capacity will usually be two to four times greater than anticipated requirements. Therefore, the resulting torque control is determined solely by the deflection and load characteristics of the caliper load spring. The torque transmitted can be varied by simply adjusting the bias of the load spring, usually by varying the gap to vary the movement permitted to the self-energizing end of the wrap spring before it comes to rest.

Caliper type or split ring springs are ideal as load springs, being compact in size for loads developed and having a high load-to-deflection ratio. They are simple and inexpensive. For external application the caliper spring is desirably made with an internal diameter slightly less than the diameter of the shaft to which it is to be applied, so that it must be expanded when mounted. This effects a preloading of the load spring so that desired bias is reached with little deflection to produce a desired load torque limit in the assembly. In cases in which the load spring is mounted internally of a sleeve, its external diameter should be gretaer than the internal diameter of the sleeve to achieve comparable loading.

The various embodiments disclosed include both brake and clutch organizations with various means of adjustment and arrangements for locking operation in one direction of relative movement and slipping in the other or arrangements for controlled slip in both relative directions of operation. Means is also provided for adjustment of torque limitation during operation.

In the drawings:

FIG. 1 is a plan view of a device embodying the invention and designed for controlled torque limitation in both directions of operation.

FIG. 2 is a view of the device of FIG. 1 in side elevation with portions broken away on the section indicated at 2—2 in FIG. 1.

FIG. 3 is a view taken in section on the line 3—3 of FIG. 1.

FIG. 4 is a view in perspective showing the wrap spring assembled on one of the shafts with the torque limiting means removed.

FIG. 5 is a view similar to FIG. 1 showing a modified embodiment of the invention having one way slip.

Figure 6:
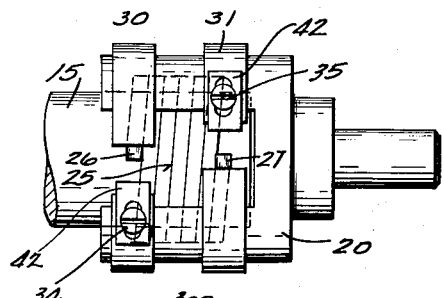
FIG. 6 is a view similar to FIG. 1 showing the modified adjusting arrangement.

In the construction shown in FIGS. 1 to 4, motion is transmitted between members 15 and 20 either of which may be the driving member and either the driven member. As an illustration of one possible application of the invention, the member 15 is shown to be provided with integral gear teeth at 16 and is rotatable on a shaft 17 carrying another gear at 18 and to which the hub portion 19 of member 20 is splined.

The wrap spring clutch 25 encircles the cylindrical surface member 15 and has radially projecting ends at 26 and 27 either of which may be the energizing end according to the direction of relative rotation of members 15 and 20. The spring ends 26 and 27 project through the slot 28 with which member 20 is provided. In this embodiment, the arcuate extent or width of the slot 28 is sufficient so that the ends 26 and 27 of the wrap spring 25 will never encounter the margins of the member 20.

Encircling member 20 in registry with the respective wrap springs 26 and 27 are two caliper type load springs 30 and 31. As shown in FIG. 1, these springs are respectively slotted at 32 and 33 and their slotted ends are adjustably positioned on the outer clutch member 20 by means of set screws 34 and 35 respectively. The load springs are desirably pre-stressed by designing them to be contractile upon the outer clutch member 20. In other words, each spring must be forcibly expanded in order to engage it over the clutch member 20.

The respective load springs 30 and 31 have relatively fixed ends at 37 and 38 and relatively yieldable ends at 39 and 40. FIG. 1 shows the terminal 26 of wrap spring 25 engaged with the yieldable end 39 of caliper load spring 30 while the free end 27 of the wrap spring is engaged with the yieldable end 40 of caliper load spring 31.

This arrangement will adjustably limit the transmission of torque in either direction between members 15 and 20. It operates as follows:

Assuming the member 15 to be the driving member rotating counterclockwise as viewed in FIG. 3, the frictional engagement of the wrap spring 25 with member 15 will tend to increase the wrap at the end of the wrap spring provided with terminal 27. This then will be the self-energizing end of the wrap spring. The wrap will constrain the spring 25 to turn with the driving member 15. Its motion will be transmitted through the terminal 26 and the free end 39 of load spring 30 to the driven member 20 until such time as the torque exceeds the bias or resistance of the load limiting spring 30. Thereupon the spring 30 will yield to allow relative bodily movement of the driving member 15 and wrap spring 25 with respect to the driven member through an angle such that the terminal 27 at the self-energizing end of the wrap spring comes in contact with the adjustably fixed end 38 of the caliper spring 31. When this happens, the energizing end of the wrap spring will become deenergized and the clutch will slip.

If the member 15 is still the driving member but its direction is clockwise as viewed in FIG. 3, then its terminal 26 will be the self-energizing end and the thrust will be transmitted from terminal 27 of the wrap spring 25 to the end 40 of load limiting caliper spring 31. The point at which the caliper spring yields sufficiently to permit bodily displacement of the wrap spring respecting driven member 20 to engage terminal 26 of the wrap spring with fixed end 37 of load limiting spring 30 will determine the point at which the clutch will slip. If the member 20 rather than the member 15 is the driving member, the motion will be transmitted, according to its direction, through one or another of the free ends 39 or 40 of the load springs 30 or 31 and thence to the terminals 26 or 27 of the wrap spring 25. Until the transmitted torque occasions the yielding of the load spring through which motion is transmitted, the wrap spring and the driven member 15 will operate in unison with the driving member 20. When the transmitted torque causes the yielding of the load spring through which the motion is being transmitted, such yielding will allow the self-energizing end of the wrap spring ultimately to contact the fixed end 37 or 38 which serves as a stop (or such other stop as may be provided), thereby deenergizing the wrap spring and allowing clutch slip.

The torque value of the clutch is equal to the force required to deflect the caliper load spring to the release point, times the radius of the parts subject to this force. The slip clutch torque capacity is independent of the coefficient of friction and is determined solely by the allowed deflection for a caliper load spring having given load characteristics. In other words, since the bias of the load spring builds up as deflection occurs, in a given clutch the torque capacity can be varied by adjusting the amount of gap or motion permitted between the self-energizing end of the wrap spring and the stop here represented by the fixed ends 37 and 38 of the respective wrap spring.

In the construction shown in FIGS. 1 to 4, it is necessary to adjust the entire load spring peripherally in order to adjust the location of the stop engaged by the non-energizing end of the wrap spring. FIG. 6 shows that the stop members 42 may comprise slotted plates superimposed on the ends of the caliper load springs to be anchored by the same screws but independently adjustable.

In FIG. 5, a device is disclosed which will lock in one direction of relative rotation and slip under predetermined torque in the opposite direction. In this device, the slot 280 in clutch member 200 has a margin 43 which functions as a stop and is closely proximate its opposite margin 44 to allow only limited oscillation of the wrap spring terminal 27. This replaces the caliper load spring 31 of FIG. 1, the structure being otherwise identical to that above described. In this device, since there is no yielding in the transmission of motion from the non-energizing end 27 to the margin 43 of the outer or driven member 200, the device locks when the member 15 is the driving member and is rotated clockwise as viewed from the righthand end of the device. In the event of counterclockwise rotation, the clutch will slip when limited torque has been transmitted. If member 15 is the driving member, the clutch will lock if the member 15 is turned counterclockwise as viewed from the lefthand end of FIG. 5 and will slip under predetermined torque if the direction of rotation is clockwise.

Figure 8:
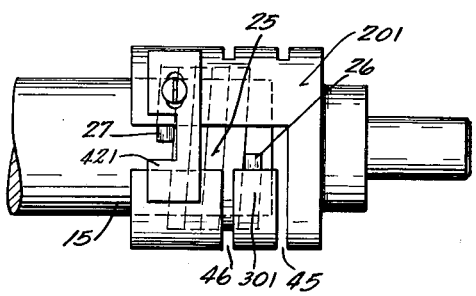
FIG. 8 is a view similar to FIG. 1 showing a modified embodiment in which the caliper spring is integral with the sleeve portion of the clutch.

FIG. 8 shows an arrangement somewhat comparable to that of FIG. 5 except that the outer clutch member 201 is slotted at 45 and 46 so that an integral portion thereof designated by reference character 301 provides the load spring. Also, a modified form of stop plate 421 is illustrated.

Figure 7:
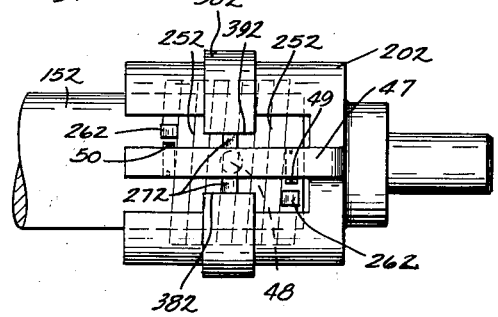
FIG. 7 is a view similar to FIG. 1 showing a modified arrangement using two wrap springs and a single caliper spring.

The arrangement shown in FIG. 7 is one in which there is controlled torque slip in both directions of relative rotation of the inner clutch member 152 and the outer clutch member 202. In this instance, two wrap springs 252 are used. The two springs are wound in the same relative sense, the arrangement being such that the outermost terminals 262 are, in each case, the self-energizing ends of the respective wrap springs. The innermost terminals 272 of the respective wrap springs are confined between the central rib 47 of driving member 202 and the free ends 382 and 392 of a single caliper load spring 302. This may optionally be anchored at its midpoint to the opposite side of the driving member 202 as shown by the screw 48 illustrated in dotted lines. However, no anchorage is needed. The device shown will slip under predetermined torque load in either direction of relative rotation of the clutch member. The torque load may be manually adjusted by means of set screws 49 and 50 adjustably threaded through the rib 47 in the path of the self-energizing ends of the respective wrap springs.

Figure 9:
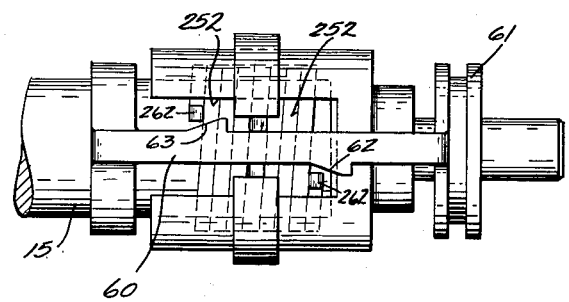
FIG. 9 is a view similar to FIG. 1 showing the modified arrangement permitting manual control of torque during operation to engage or disengage or limit the functioning of the clutch.

The stop means may be adjusted during rotation of the driving and driven members of the clutch, if desired. FIG. 9 shows an arrangement for this purpose. It happens to be based on an embodiment otherwise similar to that described in connection with FIG. 7. Instead of having the set screws 49 and 50 to serve as adjustable stops as above described, FIG. 9 contemplates the provision of a cam plate 60 reciprocable axially of the assembly subject to the control of a shifting collar 61 and a conventional fork (not shown). The cam plate 60 has beveled lateral edges at 62 and 63 in the path of the self-energizing ends 262 of the wrap springs 252 whereby the axial position of the cam plate 60 will determine the point at which the respective wrap springs will cease to become self-energizing and the clutch will start to slip.

Figure 11:
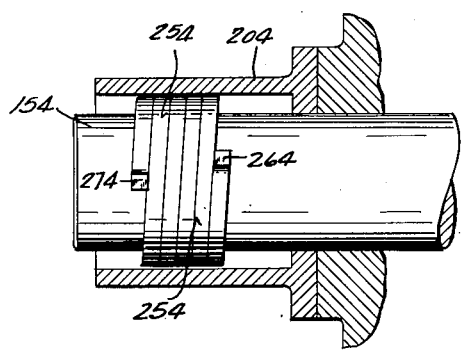
FIG. 11 is a view of the brake in axial section on the line 1—1 of FIG. 10.
Figure 10:
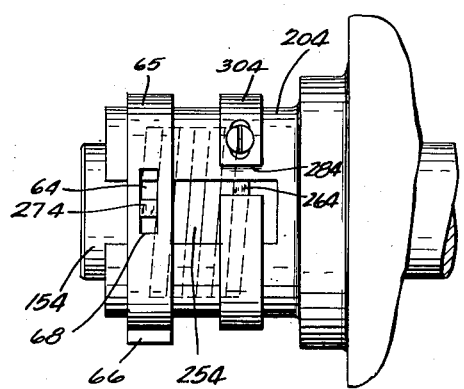
FIG. 10 is a diagrammatic fragmentary plan view of a brake mechanism embodying the invention.
Figure 12:
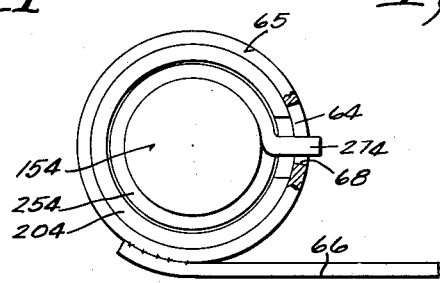
FIG. 12 is a view of the brake in end elevation.

FIGS. 10, 11 and 12 illustrate the application of the same principles to a brake. The shaft 154 is the part to be subjected to braking action. As shown in FIG. 12, the device is designed to function when the shaft 154 is rotated clockwise. The complementary member 204 is fixed against rotation. The wrap spring 254 is wound upon the inner member 154 and has its terminal 264 projecting through the slot 284 into engagement with the load in the caliper load spring 304. The terminal 264 is the non-energizing terminal in the assumed direction of rotation of the parts.

The energizing terminal 274 projects through an opening 64 in the collar 65 which is rotatable on the outer member 204 subject to the control of a lever 66 which may be operated manually or by any other means. If this member is adjusted so that its margin 68 engages the self-energizing end 274 of the wrap spring 254, the wrap will be released. At any given adjustment of the collar 65, the position at which this release will occur, and the braking torque exerted, will depend on the bias of the load spring 304. However, if the position of the collar is such that release occurs before any bias is developed in the load spring 304, the braking action will be substantially wholly relieved. If the collar is moved to a position such that the relative movement of the wrap spring against the bias of load spring 304 is incapable of engaging the terminal 274 with the margin 68 of the collar, in such a case there will be no release and the brake action will be at maximum value.

Figure 14:
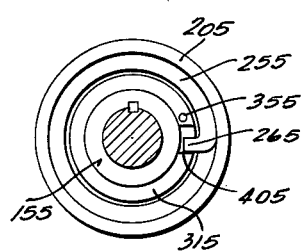
FIG. 14 is a view in end elevation of the embodiment shown in FIG. 13, the shaft being shown in section.
Figure 13:
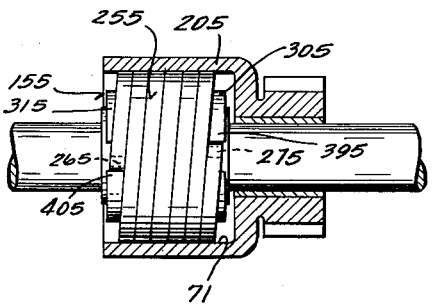
FIG. 13 is a view showing a modified embodiment of the invention, the clutch spring being in elevation and the sleeve broken away in axial section.
Figure 15:
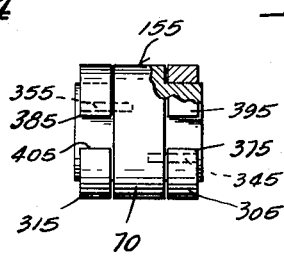
FIG. 15 is a view in plan showing the inner hub element and the caliper type load springs, each pinned at one end thereto.

From among the many possible constructions of controlled torque slip clutches utilizing wrap springs which are biased for expansion rather than contraction, I have selected the construction shown in FIGS. 13, 14 and 15 because it is comparable to the exemplifications already described.

The clutch elements include a wrap spring 255 encircling an inner or hub member 155 which has a central land at 70 to which the ends 375 and 385 of the caliper type load springs 305 and 315 are anchored by means of pins 345 and 355 respectively. The outer clutch element 205 is a sleeve which has a cylindrical inner surface 71 frictionally engaged by the radially compressed wrap spring 255 in response to its expansive bias. The spring ends 265 and 275 of the clutch are respectively disposed between the ends of the caliper load springs 305 and 315. The end 265 of the wrap clutch spring 255 is engaged with the free end 405 of the load spring 315. The end 275 of the wrap spring is engaged with the free end 395 of the load spring 305.

The clearance between the lugs or ends 265 and 275 of the wrap spring and the respective fixed ends 385 and 375 of the load springs will determine the torque at which the clutch spring 255 will slip within sleeve 205.

As in the constructions previously described, whenever the torque exerted in a direction such as to flex one of the load springs is effective to move the free end of that load spring through a distance such that the other end of the wrap spring engages the fixed end of the other load spring, the wrapping pressure will be relieved and the friction between the wrap spring and the outer cylinder 205 will be reduced sufficiently to permit slippage. As in the construction first described and shown in FIGS. 1 to 4, this result will follow irrespective of the direction of rotation and regardless of whether the member 155 or the member 205 is the driving element of the clutch.

From the foregoing disclosure it will be evident that the invention is generically applicable to couple two relatively rotatable parts either for clutch or braking purposes. Accordingly, the accompanying claims refer to the device generically as a coupling.

I claim:

1. The combination with two relative rotatable elements in concentric relation, of means of limited torque capacity for coupling said elements and comprising a wrap spring having coils interposed between said elements and in peripheral friction bearing engagement with one of said elements, a concentric caliper load limiting spring having a stop portion anchored to the other of said elements, an end of said caliper spring being free, the free end of the caliper spring being engaged with one end of said wrap spring and adapted to yield in response to torque to which the wrap spring is subject, and means in the path of the other end of the wrap spring in the direction in which the first said element yields in response to torque when the wrap spring deflects said free end of the caliper spring, the wrap spring being housed between said elements, the anchored stop portion of the caliper spring comprising an end thereof opposite its said free end, the said one end of the wrap spring being confined between the two ends of the caliper spring.

2. A combination according to claim 1 in which the means in the path of said other end of the wrap spring comprises another caliper spring having a fixed end from which said other end of the wrap spring is normally spaced.

3. The combination with concentric inner and outer elements, one of which is mounted for rotation relative to the other, of torque limiting means for coupling said elements and comprising a wrap spring having ends and intervening coils disposed between said elements and in peripheral bearing engagement with one of them, a caliper load limiting spring having a portion anchored to the element other than the one element with which said coils are in bearing engagement and having a free end, a stop connected to said other element, the wrap spring having an end portion engaged with the free end of the caliper spring and movable in a direction to displace the free end of the caliper spring in the direction of relative rotation between said elements, said stop being in the path of movement of the end of the wrap spring other than that engaged by the caliper spring and adapted to intercept and open the wrap spring upon predetermined yielding of the caliper spring, the stop having means mounting it for adjustment to vary its position in the path of the wrap spring end engageable therewith, and means for adjusting the stop.

4. The combination set forth in claim 3 in which the stop adjusting means comprises mechanism for effecting stop adjustment during rotation of said elements.

5. The combination with a pair of relatively rotatable elements, of means of limited torque transmitting capacity for coupling said elements and comprising a wrap spring having ends and having coils intervening between said elements and in peripheral engagement with one of said elements, two caliper load limiting springs substantially coaxial with said elements and each having the form of a split ring with an anchored portion and a free end, the free end of each caliper spring being engaged by one end of the wrap spring and adapted to yield in response to torque between said element in one direction of relative rotation, the anchored portion of each caliper spring being connected with the other element and providing a stop in the path of movement of the other end of the wrap spring in one direction in which the wrap spring yields respecting said other element when it deflects the free end of the opposite caliper spring.

6. The combination with two relative rotatable elements, one of which is provided with a generally cylindrical bearing surface, of means of predeterminable torque capacity for coupling said elements and comprising a wrap spring having coils interposed between the elements and in peripheral bearing engagement with said surface, the wrap spring having terminals exposed at opposite ends of said coils, a caliper load limiting spring connected with the element other than that provided with said bearing surface and having a free end engaged with one of the wrap spring terminals, said other element having stop means in the path of the other of said terminals in the direction of relative movement between said elements in which the free end of the caliper spring yields when subjected to torque in the relative movement of said elements, said other element having a slot providing a margin in the path of one of, and normally engaged with one of, said terminals and a second margin normally spaced from said one terminal.

7. In a torque limiting coupling the combination with concentric relatively rotatable elements, of a wrap spring encircling the inner of said elements and having exposed terminals, one of said elements having a peripheral surface with which intermediate coils of said wrap spring are in bearing engagement, a pair of caliper load limiting springs connected with the element other than that providing said bearing surface and having yieldable ends respectively directed in opposite directions peripherally between said elements in the path of the terminals of the wrap spring, and means connected with the same element with which the caliper springs are connected and constituting stops disposed oppositely in the paths of respective terminals of the wrap spring and in opposition to the free ends of respective caliper springs.

8. The combination set forth in claim 7 in which the terminals of the wrap spring are offset radially from said intermediate wrap spring coils.

9. The combination set forth in claim 7 in which the means which provide the stops comprise terminals of respective caliper springs between the anchorage and the opposing terminals first mentioned.

10. The combination with two relatively rotatable elements, one of which is provided with a generally cylindrical bearing surface, of means of variably predeterminable torque capacity for coupling said elements in both directions of rotation and comprising wrap spring means having coils interposed between said elements and in peripheral bearing engagement with said surface, said wrap spring means having terminals exposed at its opposite ends, caliper load limiting spring means connected with the wrap spring means and with the element other than that having said bearing surface, and adjustable means for variably limiting the movement of said wrap spring terminals respecting said other element and constituting means for variably predetermining the torque transmitted between said elements.

11. A combination according to claim 10 in which the adjustable means for variably limiting the movement of the wrap spring terminal comprises means for adjustably fixing the position of the caliper spring means in a selected rotated position upon the element other than that having the bearing surface.

12. A combination according to claim 10 in which the adjustable means for variably limiting the movement of the wrap spring terminal respecting said other elements includes a stop member other than said other element, means guiding said stop member for movement axially of said other element, said stop member having axially offset portions of differing extent peripherally of said other element in the path of at least one of the wrap spring terminals, whereby the axial movement of said member positions one of said portions of differing peripheral extent selectively in the path of a wrap spring terminal, its distance from the terminal depending on what portion of the stop member is presented to the terminal in the selected adjusted position of such member.

13. A combination according to claim 10 in which the adjustable means for variably limiting the movement of the wrap spring terminal comprises a separate stop member having a portion in the path of at least one of said terminals and having means adjustably connecting it with the element other than that having the bearing surface.

14. A combination according to claim 13 in which the wrap spring means comprises a pair of wrap springs engaged with said surface and disposed end to end and having non-energizing terminals which are spaced peripherally of said bearing surface, stop means with which said non-energizing terminals are normally engaged, caliper load limiting spring means encircling said bearing surface and having free end portions oppositely engaged with said last mentioned terminals, the adjustable means for variably limiting the movement of the other terminals of the respective wrap springs comprising separate stop members respectively disposed in the path of said other terminals and at least one of which has means adjustably connecting it as aforesaid with the element other than that having a bearing surface.

15. A combination according to claim 14 in which the element other than that having the bearing surface has an axial slot and a central rib projecting longitudinally of said slot, the said non-energizing terminals projecting through said slot and engaged with opposite sides of the rib, the free ends of the caliper load limiting spring means being oppositely engaged with the said non-energizing terminals of the respective wrap springs and tending to hold said non-energizing terminals against said rib, the other terminals of said wrap springs comprising energizing terminals projecting through said slot at respectively opposite sides of said rib, and the adjustable means for variably limiting the movement of the energizing wrap spring terminals being interposed between said rib and at least one of said energizing wrap spring terminals.

References Cited in the file of this patent

UNITED STATES PATENTS

| | | |
|---|---|---|
| 2,360,187 | Almen | Oct. 10, 1944 |
| 2,459,972 | Starkey | Jan. 25, 1949 |
| 2,510,644 | McCormick | June 6, 1950 |
| 2,595,454 | Greenlee | May 6, 1952 |
| 2,793,515 | Hunstiger et al. | May 28, 1957 |